US012136515B2

United States Patent
Ajuria Arregi et al.

(10) Patent No.: US 12,136,515 B2
(45) Date of Patent: Nov. 5, 2024

(54) METAL ION CAPACITOR BASED ON HARD CARBON AS NEGATIVE ELECTRODE AND A MIXTURE OF ACTIVATED CARBON AND SACRIFICIAL SALT AS THE POSITIVE ELECTRODE

(71) Applicant: FUNDACION CENTRO DE INVESTIGACION COOPERATIVA DE ENERGIAS ALTERNATIVAS CIC ENERGIGUNE FUNDAZIONA, Alava (ES)

(72) Inventors: Jon Ajuria Arregi, Alava (ES); Maria Arnaiz Gonzalez, Alava (ES); Michel Armand, Alava (ES); Daniel Carriazo Martin, Alava (ES); Devaraj Shanmukaraj, Alava (ES)

(73) Assignee: FUNDACION CENTRO DE INVESTIGACION COOPERATIVA DE ENERGIAS ALTERNATIVAS CIC ENERGIGUNE FUNDAZIOA, Alava (ES)

( * ) Notice: Subject to any disclaimer, the term of this patent is extended or adjusted under 35 U.S.C. 154(b) by 189 days.

(21) Appl. No.: 17/756,222

(22) PCT Filed: Jan. 7, 2021

(86) PCT No.: PCT/EP2021/050185
§ 371 (c)(1),
(2) Date: May 19, 2022

(87) PCT Pub. No.: WO2021/140149
PCT Pub. Date: Jul. 15, 2021

(65) Prior Publication Data
US 2022/0406532 A1  Dec. 22, 2022

(30) Foreign Application Priority Data
Jan. 8, 2020 (EP) .................................. 20382006

(51) Int. Cl.
*H01G 11/34* (2013.01)
*H01G 11/06* (2013.01)
*H01G 11/86* (2013.01)

(52) U.S. Cl.
CPC ............. *H01G 11/34* (2013.01); *H01G 11/06* (2013.01); *H01G 11/86* (2013.01)

(58) Field of Classification Search
CPC ........ H01G 11/34; H01G 11/06; H01G 11/86; H01G 11/14; H01G 11/38; H01G 11/50; H01G 11/04; Y02E 60/13
See application file for complete search history.

(56) References Cited

U.S. PATENT DOCUMENTS

| 2013/0298386 A1* | 11/2013 | Tarascon | H01M 10/0525 29/623.1 |
| 2013/0337346 A1* | 12/2013 | Miyoshi | H01G 9/025 361/527 |
| 2017/0301485 A1* | 10/2017 | Cao | H01G 11/06 |
| 2018/0219250 A1 | 8/2018 | Delobel et al. | |
| 2019/0318882 A1 | 10/2019 | Cao et al. | |
| 2021/0039970 A1* | 2/2021 | Metzger | C02F 1/4604 |

FOREIGN PATENT DOCUMENTS

| CN | 108028357 A | 5/2018 |
| CN | 109659140 A | 4/2019 |

(Continued)

OTHER PUBLICATIONS

Shanmukaraj D et al: "Sacrificial salts: Compensating the initial charge irreversibility in lithium batteries", Electrochemistry Communications 2010, 12(10) 1344-1347.

(Continued)

*Primary Examiner* — Michael P McFadden
(74) *Attorney, Agent, or Firm* — LUCAS & MERCANTI, LLP (57) ABSTRACT

A metal ion capacitor with outstanding power capabilities having a negative electrode based on hard carbon (HC) and a positive electrode based on a combination of activated carbon (AC) and a sacrificial salt selected from the group consisting of squarate, oxalate, ketomalonate and di-ketosuccinate or a combination thereof. The sacrificial salt is (Continued)

added to AC in the positive electrode as a source of metal ions for pre-doping the HC and to efficiently compensate its high irreversible capacity by providing the metal ions necessary for the formation of solid electrolyte interphase (SEI) on the hard carbon, allowing for a 1:1 and superior mass balances between anode and cathode. Advantageously, the extraordinary performance of this approach has been successfully demonstrated not only in lithium ion capacitors (LICs) but also in other metal ion capacitors such as sodium and potassium ion capacitors.

16 Claims, 9 Drawing Sheets (56) References Cited

FOREIGN PATENT DOCUMENTS

| | | |
|---|---|---|
| CN | 110335764 A | 10/2019 |
| EP | 3522270 A1 | 8/2019 |
| EP | 3607907 A1 | 2/2020 |
| WO | 2019110947 A1 | 6/2019 |

OTHER PUBLICATIONS

Jezowski P et al: "Safe and recyclable lithiumion capacitors using sacrificial lithium salts", Nature Materials 2017, 17(2), 167-173.

Zheng J. P. et al. "Constructing High Energy and Power Densities Li-Ion Capacitors Using Li Thin Film for Pre-Lithiation," Journal of The Electrochemical Society, 2017, 164, A2164-A2170.

* cited by examiner

METAL ION CAPACITOR BASED ON HARD CARBON AS NEGATIVE ELECTRODE AND A MIXTURE OF ACTIVATED CARBON AND SACRIFICIAL SALT AS THE POSITIVE ELECTRODE

CROSS REFERENCE TO RELATED APPLICATION

This Application is a 371 of PCT/EP2021/050185 filed on Jan. 7, 2021 which, in turn, claimed the priority of European Patent Application No. 20382006.3 filed on Jan. 8, 2020, both applications are incorporated herein by reference.

TECHNICAL FIELD OF THE INVENTION

The present invention relates to the field of electrochemical energy storage and more particularly to a metal ion capacitor (MIC) that exhibits both high energy and high power densities.

BACKGROUND OF THE INVENTION

In recent years, considerable research has been focused on electrochemical energy storage in response to the growing demand of high energy density delivery at high power. On the one hand batteries, such as Lithium ion batteries (LIBs), rely on faradaic reactions that can provide very high energy densities, however they are limited by power and cyclability. On the other hand supercapacitors store charge by means of capacitive reactance allowing high power and long cyclability at the cost of energy density. Lately, metal ion capacitors (MICs), and particularly those based on lithium ion, have emerged as a combined solution, with the potential to offer high energy density at high power density along with long cyclability by merging the aforementioned technologies, using a battery grade electrode paired with a capacitor type electrode.

Among the different Lithium ion capacitors (LICs) developed in the last years, dual carbon based LICs are promising with even a commercial product on the market (ULTIMO®, JM Energy). Nevertheless, intensive commercialization of this kind of systems is hindered by the irreversible loss of charge (e−) and active lithium (Li+) during cycling, affecting Coulombic and energy efficiencies. The main mechanism identified so far corresponds to the solid electrolyte interphase (SEI) formation at the negative electrode during the first charge. Accordingly, a so-called prelithiation step that compensates for this Li+ (and electron) loss is necessary to reach full utilization of the active materials. This is one of the major issues considered during the manufacture of LIB and LIC with high efficiency. Noteworthy, although they are common to both LIB and LIC, prelithiation is even more critical for LIC because any additional source of Li+ions should be large enough to not only address SEI formation but also to lithiate (on charge) the negative electrode. Thus, prelithiation of carbons in LICs remain a major technological barrier. Therefore, commercial LICs are so far based on anodes made of graphite, that, despite its sluggish kinetics, presents lower first cycle irreversibility than other carbonaceous materials such as hard carbon and enables easier prelithiation solutions.

Along the years several techniques have been used to prelithiate graphite in LICs. Fuji Co. proposed the approach that is currently being used in industry (ULTIMO®, JM Energy) using a lithium foil as the third electrode to prelithiate the graphite anode electrodes and this LIC structure results in an electrochemical energy storage device with three electrodes (cathode, anode, and the sacrificial lithium metal electrode). This three-electrode structure LIC requires the use of a mesh-type current collector for both cathode and anode in order to enable the transportation of the lithium ions into and between the cathode and anode, which makes the cell design complicated and expensive to manufacture. Furthermore, it reintroduces hazards related to the early lithium ion batteries based on the use of metallic lithium, such as the risk of short-circuiting and thermal runaway. Alternatively, electrochemical prelithiation can be done in a separate cell. However, the electrochemical prelithiation process often requires a re-assembling step of the prelithiated negative electrode into the LIC cell under inert atmosphere, which is cost-increasing and reduces the possibility to use this method in a commercial way.

Consequently alternative cost-effective prelithiation strategies have been developed along these years. One of the most widely extended approach consists of using a composite cathode. Lithiated metal oxides are incorporated to the positive electrode and combined with the activated carbon as an irreversible source of lithium. Metal oxides such as $Li_2MoO_3$, $Li_5FeO_6$ or $Li_2RuO_3$ have been proposed achieving full prelithiation degree of graphite electrodes. Still, this approach presents some drawbacks that should be addressed for its implementation as a viable solution for prelithiation. Firstly, lithium extraction potential of most of these metal oxides is above 4.7 V vs. Li/Li+ promoting electrolyte decomposition that negatively affects posterior LIC cyclability. Secondly, decomposed metal oxides remain as dead mass in the cell, penalizing energy density. Lastly, the high cost of metal oxides has a negative impact in the price of overall final product. In order to address these issues, the sacrificial salt concept has been very recently adopted from the lithium ion batteries (LIBs) technology. Carbonyl based organic compounds with lithium incorporated in their structure that can be irreversibly oxidized, (i.e. lithium extracted), are mixed with the activated carbon in the positive electrode. That is a synergetic mixture, since these organic compounds are highly insulating and require high amount of conducting carbon to decompose, a drawback in LIB technology that is absent in LICs since the active material is already a highly conducting carbon. Jezowski et al. (Safe and recyclable lithium-ion capacitors using sacrificial organic lithium salt, Nature materials, 2017, 1-7) developed this approach for the first time by synthesizing 3,4-dihydroxybenzonitrile dilithium salt with a delithiation potential of 3.5 V vs Li/Li+ and a high theoretical capacity of 365 mAh $g^{-1}$ that could fully prelithiate the graphite electrode. The resulting oxidized quinone is soluble, leading to a shuttle mechanism. Besides, the developed LIC lacks high power, hindered by the use of graphite.

Due to their high first cycle irreversibility, hard carbons have been excluded from the above mentioned prelithiation solutions and have attracted much less attention. Hard carbons demand a very elevated degree of pre-lithiation in view of their high irreversible capacity and therefore pre-lithiation of a hard carbon-based anode has always been addressed by using Lithium metal which provides a near limitless supply of lithium ions. In this regard Zheng et al. pioneered prelithiation for hard carbons by using metallic lithium in different forms. Firstly, Stabilized Lithium Metal Powder (SLMP) was used to successfully prelithiate the hard carbon. Nevertheless, despite lithium being stabilized, is still highly reactive and safety issues that are not compatible with industrial scale manufacturing arise. An alternative strategy was also developed by the same group using metallic lithium strips in direct contact with electrolyte. Again hard carbons were successfully prelithiated but the use of metallic lithium and the complexity of the approach hinder its industrialization. See Zheng et al. Constructing High Energy and Power Densities Li-Ion Capacitors Using Li Thin Film for Pre-Lithiation, *Journal of The Electrochemical Society*, 2017, 164, A2164-A2170.

Thus, there is still a need to develop new electrochemical energy storage solutions that overcome the limitations of the above-mentioned systems.

BRIEF DESCRIPTION OF THE INVENTION

The present invention tackles the limitations of the prior art by providing a metal ion capacitor (MIC) based on a hard carbon anode with outstanding power capabilities. In particular, the inventors have found that sacrificial salts may be added as source of metal ions to activated carbon (AC) in the positive electrode to efficiently compensate the high irreversible capacity of hard carbon (HC) anodes, allowing for a 1:1 and superior mass balances between anode and cathode. Advantageously, the extraordinary performance of this approach has been successfully demonstrated not only in lithium ion capacitors (LICs) but also in other metal ion capacitors such as sodium and potassium ion capacitors. Moreover, the MIC described herein is compatible with an industrial and easily scalable fabrication process that enables the use of HCs as negative electrode in MICs, increasing the energy and allowing targeting for higher power than that of graphite-based capacitors.

In an aspect, the present invention is directed to a metal ion capacitor comprising:
  a negative electrode which comprises a hard carbon,
  a positive electrode which comprises an activated carbon and a sacrificial salt, and
  a separator positioned between the two electrodes;
    wherein the sacrificial salt is selected from the group consisting of squarate, oxalate, ketomalonate and di-ketosuccinate or a combination thereof.

In operation, an electrolytic solution can be incorporated throughout cathode, anode and separator. The electrolytic solution comprises an electrolyte material (solute) dissolved in a solvent.

In another aspect, the present invention is directed to a process for manufacturing the metal ion capacitor as described herein, said process comprising the preparation of the negative hard carbon electrode and/or the activated carbon of the positive electrode from biomass waste.

In another aspect, the present invention is directed to the use of a sacrificial salt as a source of metal ions for pre-doping a negative electrode of a metal ion capacitor and to compensate for the need of metal ions to form the solid electrolyte interphase (SEI) on the negative electrode, wherein said sacrificial salt is combined with activated carbon in the positive electrode, said sacrificial salt being selected from the group consisting of squarate, oxalate, ketomalonate and di-ketosuccinate or a combination thereof, and wherein said negative electrode comprises a hard carbon.

These aspects and preferred embodiments thereof are additionally also defined hereinafter in the detailed description and in the claims.

BRIEF DESCRIPTION OF THE DRAWINGS

To better understand the invention, its objects and advantages, the following figures are attached to the specification in which the following is depicted.

DETAILED DESCRIPTION OF THE INVENTION

Current alkali metal ion capacitor technology, e.g. lithium ion capacitor (LIC), is based on a dual carbon electrode system, being graphite the most commonly used material in the negative electrode. For LICs, higher pre-lithiation degrees are required compared to lithium ion batteries (LIBs), since the positive electrode is not a lithium source and all the lithium must come from the prelithiation source. Thus, currently graphite is used as the negative electrode owing to its low irreversible capacity being only about 5%, therefore minimizing the lithium amount needed in the prelithiation step. Nevertheless, the sluggish kinetics of graphite limits LIC technology in terms of power and the use of more powerful materials in the negative electrode is highly desirable. Further, the technology should be applicable not only to LICs but also to other metal ion capacitors such as sodium ion and potassium ion capacitors.

The solution provided in this invention is a metal ion capacitor which comprises:
  at least one anode comprising a hard carbon (HC),
  at least one cathode comprising an activated carbon (AC) and a sacrificial salt selected from the group consisting of squarate, oxalate, ketomalonate and di-ketosuccinate or a combination thereof, and
  a separator interposed between the two electrodes.

The electrodes, anode and cathode, are preferably immersed or otherwise positioned in an electrolytic solution with the separator interposed between them.

The anode is made of hard carbon. As used herein, the HC material preferably has a specific surface area less than about 500 m$^2$/g, e.g., less than about 100 m$^2$/g. In embodiments, the HC material used to form the anode is non-graphitizable and may preferably have an average particle size of less than about 100 microns, e.g., less than about 100, about 10, about 5 or less than or equal to about 1 microns. In a more preferred embodiment, the HC material has an average particle size is in the range from about 0.1 to about 5 microns, e.g., from about 0.5 to about 2 microns, or more specifically about 1 microns. Unexpectedly, even with low particle size good performance may be achieved. A thickness of the anode containing HC can range, for example, from about 25 to about 600 microns.

The cathode is made of a composite material that comprises activated carbon and a sacrificial salt. As used herein, the AC material preferably has a specific surface area greater than about 500 m$^2$/g. In embodiments, the AC material used to form the cathode may preferably have an average particle size of less than 100 microns, e.g., less than about 100, about 10 or about 5 microns. A thickness of the cathode containing AC/sacrificial salt can range, for example, from about 25 to about 600 microns.

According to the present invention, the HC and AC that act respectively as anode and cathode can be synthetized from a wide variety of precursors, such as sucrose, cellulose, polyvinyl (PVC), furfuryl alcohol or even better, from sustainable resources like recycled biomass. In preferred embodiments, these carbon materials are prepared from biomass waste such as coconut shells, peanut shells, fruit peels, olive pits, etc. Of course, a combination of two or more precursors may be employed for preparing the carbons of the present invention. In a particular preferred embodiment, HC and AC are synthesized from recycled olive pits.

Generally, the preparation of HC comprises heating the carbon precursor at high temperature, normally about 600° C. or more (e.g. about 600-1800° C., about 650-1500° C., about 700-1200° C., or about 750-1000° C.) for at least about 30 min (e.g. about 30-240 min) under atmosphere inert (e.g. Ar flow) so as to pyrolyze said precursor. If solid, the carbon precursor may be crushed prior to the pyrolysis. In certain instances, the temperature is increased gradually (e.g. ramp rate of about 2-10° C. min$^{-1}$) until reaching the pyrolysis temperature.

In accordance with a particular embodiment, HC is prepared from biomass waste (e.g. olive pits) by a process comprising heating the biomass waste, preferably previously crushed, at a ramp rate of about 3-8° C. min$^{-1}$ to a predefined temperature ranging from about 600-1800° C. (e.g. about 750-1000° C.) and further holding it for about 1.5-2.5 h. In a more particular embodiment, biomass waste is crushed and loaded in a furnace (e.g. a tubular furnace) for the pyrolysis process by heating under an Ar flow (e.g. of about 50-250 ml min$^{-1}$) at a ramp rate of about 4-6° C. min$^{-1}$ to a predefined temperature ranging from about 750-1000° C. (e.g. about 800° C.) and further holding it for about 1.5-2.5 h.

In order to tune the particle size and tailor the HC for high power applications, the HC may be then mechanically ground and milled. In particular embodiments, after pyrolysis, the HC is then manually coarse-ground in a mortar/pestle, before being ball-milled in a planetary mill. Milling may be performed for about 60-120 minutes.

The Activated Carbon (AC) may be prepared from the previously obtained Hard Carbon (HC) (without being mechanically ground and milled). Generally, to prepare the Activated Carbon (AC), the previously obtained Hard Carbon (HC) (without the ground and ball milling step) may be physically mixed with an hydroxide such as potassium hydroxide in different mass ratios, normally about 1:1 or more (e.g. about 1:10, about 1:8, about 1:6, about 1:4 or about 1:2). The HC mixed with hydroxide may be then activated by heating up to a temperature between about 600-800° C. (e.g., about 650° C., about 700° C., about 750° C.) under atmosphere inert (e.g. Ar flow). In embodiments, the materials mixture is placed in a boat and activated by heating up to a temperature between about 600-800° C. (e.g., about 650° C., about 700° C., about 750° C.) under atmosphere inert (e.g. Ar flow between about 50-250 ml min$^{-1}$), preferably inside a horizontal stainless steel tube, within a furnace (e.g. a tubular furnace). In certain instances, the temperature is increased gradually (e.g. ramp rate of about 2-10° C. min$^{-1}$). The holding time at the defined temperature may be normally set between about 30 min and about 5 h (e.g, between about 1-2h, about 2-3h, about 3-4h, about 4-5h). After activation, the microporous AC may be washed off until neutral pH and dried. For instance, the microporous AC may be washed off with a diluted solution of acid and water until neutral pH is reached and then dried at about 100-150° C., preferably under vacuum.

In accordance with a particular embodiment, AC is prepared by physically mixing previously obtained HC with potassium hydroxide in about a 1:5 to 1:7 mass ratio. Mixed materials are placed in a boat (e.g. an Inconel@ boat) and activated by heating up to about 650-750° C. under an Ar flow of about 50-250 mL min$^{-1}$ inside a horizontal stainless steel tube within a tubular furnace. The temperature is increased gradually at a ramp rate of about 3-8° C. min$^{-1}$ and the holding time at the defined temperature is set at about 1.5-2.5 h. After activation, the microporous AC is washed off with a diluted solution of hydrochloric acid and water until neutral pH was reached and then dried at about 120° C. under vacuum.

The AC is combined with a sacrificial salt in the cathode of the metal ion capacitor of the present invention. The sacrificial salt acts as a source of metal ions for pre-doping the negative electrode and to compensate for the need of metal ions to form the solid electrolyte interphase (SEI) on the negative electrode. More particularly, the term "sacrificial salt" refers to a metal salt that is able to decompose releasing metal ions during the first charge(s) so that the metal ions may be charged into the negative electrode and the loss of active metal ions due to SEI formation is compensated. That is, the sacrificial salt is capable of supplying metal ions into the structure of HC as well as compensating its high irreversible capacity by providing the metal ions necessary for the formation of the passivation layer at the surface of the negative electrode.

Sacrificial salts useful in the present invention include squarates, oxalates, ketomalonates and di-ketosuccinates or a combination thereof. The metal of the sacrificial salt is preferably selected from a metal ion of +1 charge such as an alkali metal. The chemical formula of these salts for metal ions of +1 charge such as alkali metal ions (e.g. Li, Na, and K) are as follows: squarate ($M_2C_4O_4$), oxalate ($M_2O_2O_4$), ketomalonate ($M_2O_3O_6$) and di-ketosuccinate ($M_2O_4O_6$), wherein M is a metal ion of +1 charge. All these salts convert into the gaseous products of CO and $CO_2$, which produce no residues and, thus, could be removed after cell formation cycles.

In accordance with particular embodiments, the sacrificial salt is selected from the group consisting of squarate, and ketomalonate or a combination thereof. In more particular embodiments, the sacrificial salt is a squarate of formula $M_2O_4O_4$ wherein M is selected from Li, Na and K. The chemical structure of $Li_2C_4O_4$, $Na_2C_4O_4$ and $K_2C_4O_4$ and their decomposition reaction are depicted below.

a) $Li_2C_4O_4 \rightarrow 2CO_2 + 2C + 2e^- + 2Li^+$ b) $Na_2C_4O_4 \rightarrow 2CO_2 + 2C + 2e^- + 2Na^+$ c) $K_2C_4O_4 \rightarrow 2CO_2 + 2C + 2e^- + 2K^+$ The composite cathode can be formed from a mixture of sacrificial salt and activated carbon in a suitable ratio. In embodiments, the amount of sacrificial salt in the composite electrode can range from about 10 wt. % to about 60 wt. % (e.g., about 10, about 20, about 30, about 40, about 50 or about 60 weight %). In a more particular embodiment, the amount of sacrificial salt in the composite electrode is about 40 wt. %.

In embodiments, the amount of AC in the composite electrode can range from about 10 wt. % to about 60 wt. % (e.g., about 10, about 20, about 30, about 40, about 50 or about 60 weight %). In a more particular embodiment, the amount of AC in the composite electrode is about 50 wt. %. In a even more particular embodiment, the composite cathode comprises about 40 wt. % of sacrificial salt and about 50 wt. % of AC.

The cathode as well as the anode may be formed by casting (e.g., tape casting) a slurry mixture of the associated components. A cathode slurry may comprise activated carbon and an optional binder, and an anode slurry may comprise hard carbon, an optional binder and an optional source of conductive carbon such as graphite or carbon black. Example binders include, but are not limited to, polyvinylidene fluoride (PVDF) and polytetrafluoroethylene (PTFE). Specific examples of conductive carbon include, but are not limited to, super C45 and super C65.

For each of the cathode and the anode, the amount of binder incorporated into the electrode may range from about 0 wt. % to about 20 wt. %, e.g., about 5 wt. % to about 10 wt. % of the overall electrode composition. For the anode, the amount of conductive carbon incorporated into the electrode may range from about 0 wt. % to about 10 wt. %, e.g., about 5 wt. % of the overall anode composition.

In a particular embodiment, the composite cathode comprises about 40 wt % sacrificial salt, about 50 wt % AC, about 5 wt % C65 and about 5 wt % PVDF.

In some embodiments, the composite cathode, which comprises activated carbon mixed with a sacrificial salt, may be porous, while the anode of hard carbon may be porous or non-porous and may, for example, be impermeable to liquids including solvents used to form an electrolytic solution. The cathode and anode may be attached to respective positive and negative current collectors. The current collectors may comprise a metal foil such as aluminum foil of copper foil.

The cathode, anode, separator and current collectors when assembled may collectively be referred to as an electrode set. In some embodiments, the electrode set may consist essentially of cathode, anode, and separator, or consist essentially of a cathode, anode, separator and respective current collectors.

A liquid electrolytic solution may be incorporated between the cathode and anode such that the electrolytic solution permeates the separator. The electrolytic solution may comprise an electrolyte material (solute) dissolved in a suitable solvent. The electrolyte material may be any material capable of functioning in an electrochemical device. In embodiments, the invention refers to a lithium ion capacitor wherein the electrolyte material is a lithium salt, i.e., a complex lithium salt such as $LiPF_6$, $LiBF_4$, $LiClO_4$, $LiAsF_6$, $LiF_3SO_3$, $Li[(CF_3SO_2)_2N]$ or $Li[(FSO_2)_2N]$ as well as mixtures thereof. In embodiments, the invention refers to a sodium ion capacitor wherein the electrolyte material is a sodium salt, i.e., a complex sodium salt such as $NaPF_6$, $NaBF_4$, $NaClO_4$, $NaAsF_6$, $NaF_3SO_3$, $Na[(CF_3SO_2)_2N]$ or $Na[(FSO_2)_2N]$ as well as mixtures thereof. In embodiments, the invention refers to a potassium ion capacitor the electrolyte material is a potassium salt, i.e., a complex potassium salt such as $KPF_6$, $KBF_4$, $KClO_4$, $KAsF_6$, $KF_3SO_3$, $K[(CF_3SO_2)_2N]$ or $K[(FSO_2)_2N]$ as well as mixtures thereof. Example solvents for forming an electrolyte solution include organic solvents or mixtures of organic solvents such as dimethyl carbonate (DMC), methyl propionate (MP), ethylene carbonate (EC), propylene carbonate (PC), diethyl carbonate (DEC), ethyl-methyl carbonate (EMC) or mixtures thereof as well as other solvents suitable for use in an electrolyte where the charge carrier is an alkaline metal ion such as lithium, sodium or potassium ion. In some embodiments, the solvent may be capable of dissolving the electrolyte material.

A complex salt such as a complex lithium, sodium or potassium salt is any ionic compound comprising a metal such as lithium, sodium or potassium and an additional metal, metalloid or non-metal atom that does not itself ionize and which is soluble in an organic solvent. For instance, $LiPF_6$ contains lithium and phosphorus as metal atoms, but the phosphorus does not ionize by itself. Rather, phosphorus ionizes as the $PF_6^-$ ion. In a further example, $LiBF_4$ contains lithium metal and the metalloid boron. Although lithium ionizes ($Li^+$), boron does not ionize by itself, but as the $BF_4^-$ ion. In a still further example, $LiClO_4$ contains lithium metal and the non-metal atoms chlorine and oxygen. The non-metal atoms ionize as the perchlorate ion ($ClO_4^-$). The solvent may be any suitable solvent for use in an electrochemical energy storage device.

In a particular embodiment, the electrolytic solution is a solution of $MPF_6$, wherein M is preferably Li, Na or K, in EC:PC.

The electrolyte material and the sacrificial salt have to be based on the same metal ion. In a particular embodiment, the invention refers to an alkali ion capacitor comprising an alkali metal sacrificial salt as positive electrode additive and an electrolyte based on an alkali metal salt. In a more particular embodiment, the invention refers to a lithium ion capacitor comprising a lithium sacrificial salt as positive electrode additive and an electrolyte based on a lithium salt. In a particular embodiment, the invention refers to a sodium ion capacitor comprising a sodium sacrificial salt as positive electrode additive and an electrolyte based on a sodium salt. In a particular embodiment, the invention refers to a potassium ion capacitor comprising a potassium sacrificial salt as positive electrode additive and an electrolyte based on a potassium salt.

A separator, or ion conducting membrane, may be interposed between anode and cathode. The separator provides ionic conductivity while ensuring effective separation between the opposite electrodes.

Basically, two types of separators can be used: either porous ones, wherein a solution of an electrolyte in a suitable solvent fills the porosity of the separator, or non-porous ones, which are generally either pure solid polymer electrolytes (i.e. electrolytes dissolved in a high molecular weight polyether host, like PEO and PPO, which acts as solid solvent) or gelled polymer electrolyte systems, which incorporates into a polymer matrix a plasticizer or solvent capable of forming a stable gel within the polymer host matrix and an electrolyte.

In a particular embodiment, the separator is made from fiber glass material.

One method of forming a metal-ion capacitor comprises assembling an electrode set comprising a composite cathode, an anode, and a separator disposed between the anode and the cathode, and then adding an electrolytic solution to the assembly.

According to particular embodiments, the positive electrode(s) and the negative electrode(s) are laminated or wound.

The metal ion capacitor of the present invention may find practical application as a driving or auxiliary storage device for electronic automobiles, hybrid electronic automobiles, etc. Further, it is suitable as a storage device for various energy generation systems such as solar energy generation and wind power generation, and as a storage device for domestic electronic equipment, etc.

The skilled person knows that numerical values relating to measurements are subject to measurement errors which place limits on their accuracy. Where terms such as "about" or "approximately" are applied to a particular value (e.g. "about 200° C." or "approximately 200° C.") or to a range (e.g. "about x to approximately y"), the value or range is interpreted as being as accurate as the method used to measure it. Unless explicitly stated otherwise, the general convention in the scientific and technical literature may be applied so that the last digit of numerical values preferably indicates the precision of measurement. Thus, unless other error margins are given, the maximum margin is preferably ascertained by applying the rounding-off convention to the last decimal place. For instance, a value of 3.5 preferably has an error margin of 3.45 to 3.54 and a range of 2% to 10% preferably covers a range of 1.5% to 10.4%.

Said variations of a specified value are understood by the skilled person and are within the context of the present invention. Further, to provide a more concise description, some of the quantitative expressions given herein are not qualified with the term "about". It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1% to about 5%)" should be interpreted to include not only the explicitly recited values of about 1% to about 5%), but also include individual values and sub-ranges within the indicated range. Thus, included in this numerical range are individual values such as 2, 3. and 4 and sub-ranges such as from 1-3, from 2-4, and from 3-5, etc. This same principle applies to ranges reciting only one numerical value.

It should be understood that the scope of the present disclosure includes all the possible combinations of embodiments disclosed herein.

The following examples are merely illustrative of certain embodiments of the invention and cannot be considered as restricting it in any way.

EXAMPLES

Example 1—Preparation of Sacrificial Salts

Figure 1:
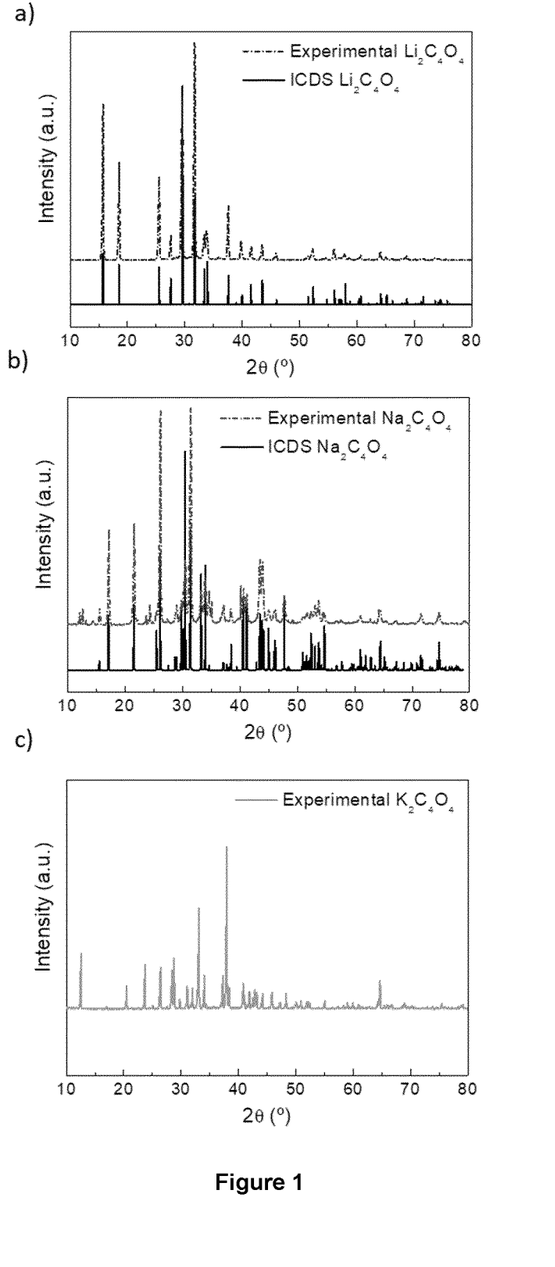
FIG. 1 shows the X-ray pattern of as synthetized squarates (experimental): $Li_2C_4O_4$, $Na_2C_4O_4$ and $K_2C_4O_4$. For lithium and sodium squarate, the X-ray pattern from the inorganic crystal structure database (ICDS) is also shown.

The sacrificial salts di-lithium squarate ($Li_2C_4O_4$), di-sodium squarate ($Na_2C_4O_4$) and di-potassium squarate ($K_2O_4O_4$) were synthesized using 4-dihydroxy-3-cyclobutene-1,2-dione and the respective metal carbonates (i.e. $Li_2CO_3$, $Na_2CO_3$ or $K_2CO_3$) as starting materials. A 1:1 mixture was taken and dissolved in deionized water followed by overnight stirring. The deionized water was removed by using a Buchi® Rotavapor and dried under vacuum at 50° C. for 12 hours prior to use. FIG. 1 depicts the XRD patterns of the sacrificial salts.

Example 2—Preparation of Electrodes: HC and Composite AC/Sacrificial Salt

Olive pits were crushed and loaded in a tubular furnace for the pyrolysis process by heating under an Ar flow of 100 ml $min^{-1}$ at a ramp rate of 5° C. min-1 to a predefined temperature of 800° C. and further holding it for 2 h (the activation yield is ~25%) to obtain hard carbons. In order to tune the particle size and tailor the HC for high power applications, the HC was then manually coarse-ground in a hard porcelain mortar/pestle, before being ball-milled using a jar and balls made of zirconia with a 1:30 HC:ball mass ratio in a Pulverisette 5 (Fritsch International, Germany). Milling was performed for 90 minutes.

To prepare the Activated Carbon (AC), the previously obtained Hard Carbon (HC) (without the ground and the ball milling step) is physically mixed with potassium hydroxide in a ⅙ mass ratio. The materials mixed with KOH are placed in an Inconel@ boat and activated by heating up to a temperature between 700° C. under an Ar flow (100 ml min$^{-1}$) inside a horizontal stainless steel tube within a tubular furnace. The heating ramp rate was 5° C. min$^{-1}$ and the holding time at the defined temperature was 2 h. After activation, the microporous AC was washed off with a diluted solution of hydrochloric acid and water until neutral pH was reached and then dried at 120° C. under vacuum (the activation yield is ~75%).

AC was mixed with each of the sacrificial salts of example 1 ($Li_2C_4O_4$, $Na_2C_4O_4$, and $K_2C_4O_4$) and conducting carbon (C65) and binder (PVDF) so as to prepare three composite materials that were used as cathode in the following examples along with the synthesized HC that acted as anode.

Example 3—Lithium ion Capacitor

The method for negative electrode prelithiation was studied in a lithium ion capacitor that contains a negative electrode based on hard carbon and a positive electrode based on activated carbon and $Li_2C_4O_4$ separated with fiber glass immersed in 1M $LiFP_6$ EC:DMC, build in an airtight Swagelok cell. FIG. 1a depicts XRD patterns of the lithium sacrificial salt synthetized (experimental, up) and registered in the inorganic crystal structure database (ICDS, down).

Figure 2:
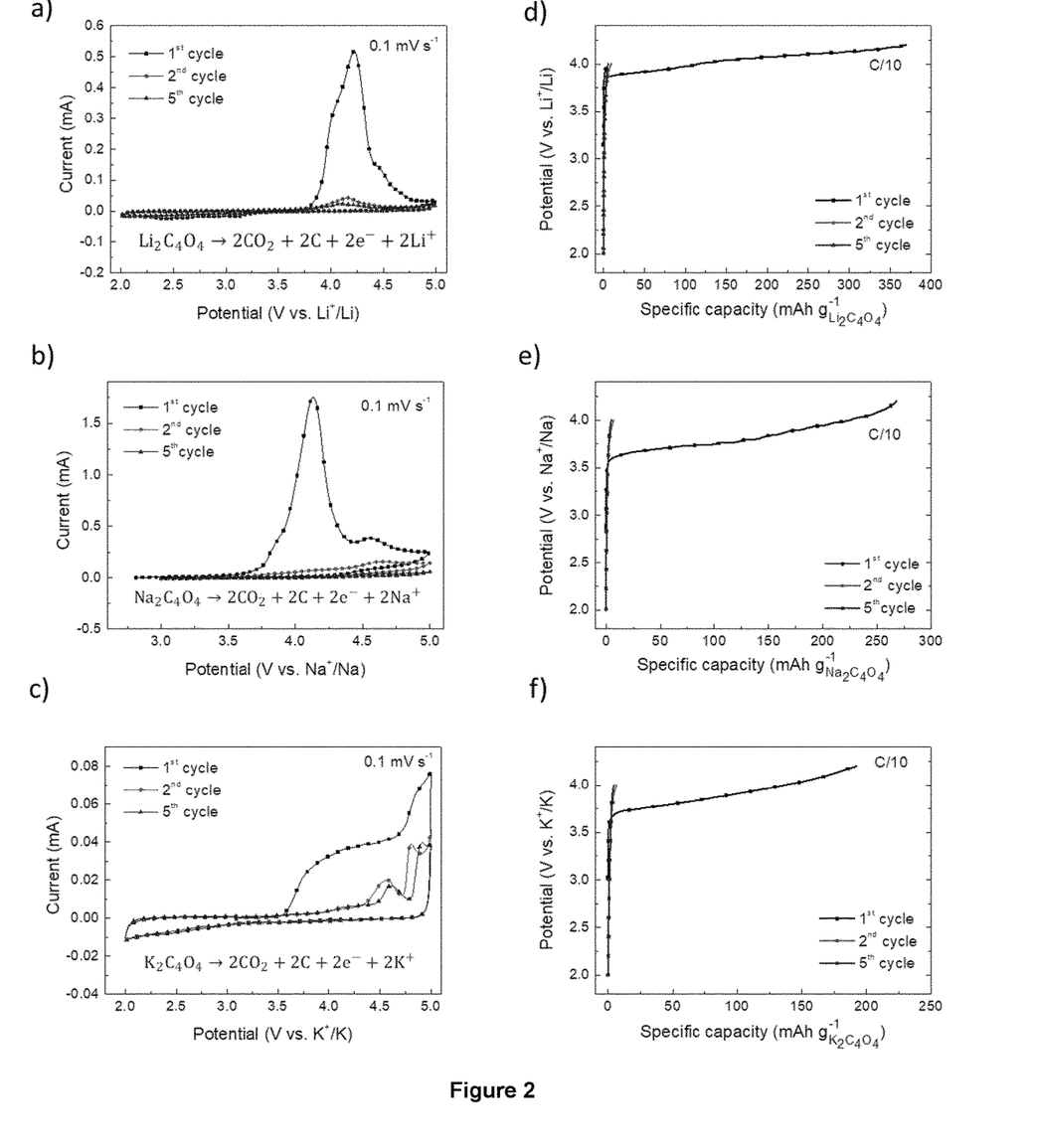
FIG. 2 shows $1^{st}$, $2^{nd}$ and $5^{th}$ cyclic voltammetry (CV) and charge/discharge cycles for $Li_2C_4O_4$, $Na_2C_4O_4$ and $K_2C_4O_4$ mixed with Super C65 in a 60:30 ratio as described in examples 3-5, showing their decomposition potentials and the high irreversibility shown by all the squarates in view of the negligible current remaining in the $5^{th}$ cycle.

FIG. 2 depicts the electrochemical performance of the synthesized salts in a half cell configuration in order to determine the decomposition potential and the experimental capacity. Since the salts are by themselves non-conducting organic compounds, they are mixed with a conducting carbon (Super C65, Imerys Graphite & Carbon) to obtain a carbon coating on the salt in order to enable its decomposition. The potential window was set between 2 and 5 volts respect the corresponding $M/M^+$ to ensure full decomposition of the salt. FIG. 2a shows the case for the lithium squarate in 1M $LiFP_6$ EC:DMC electrolyte. The first CV cycle shows a broad peak between 3.8-4.5 V vs. Li+/Li with a maxima centered at 4.2 V. Still the second cycle shows a broad but much less intense peak which describes that still some salt is remaining in the electrode after the first cycle. Even so, the absence of peaks in the following cycles shows that all the lithium has been irreversibly extracted. The Galvanostatic (GA) charge/discharge measurement were carried out between 2 and 4.2 V, potential window determined from the CV. The specific capacity vs. Li+/Li potential is shown in the FIG. 2d. The first charge at C/10 up to 4.2 V (being C the theoretical capacity of $Li_2C_4O_4$ corresponding to 425.48 mAh g$^{-1}$) shows a large plateau between 3.8-4 V vs. Li+/Li from which an irreversible specific capacity of 375 mAh g$^{-1}$ is obtained, whereas in the next cycles the capacity is almost negligible, corresponding to super C65.

Figure 3:
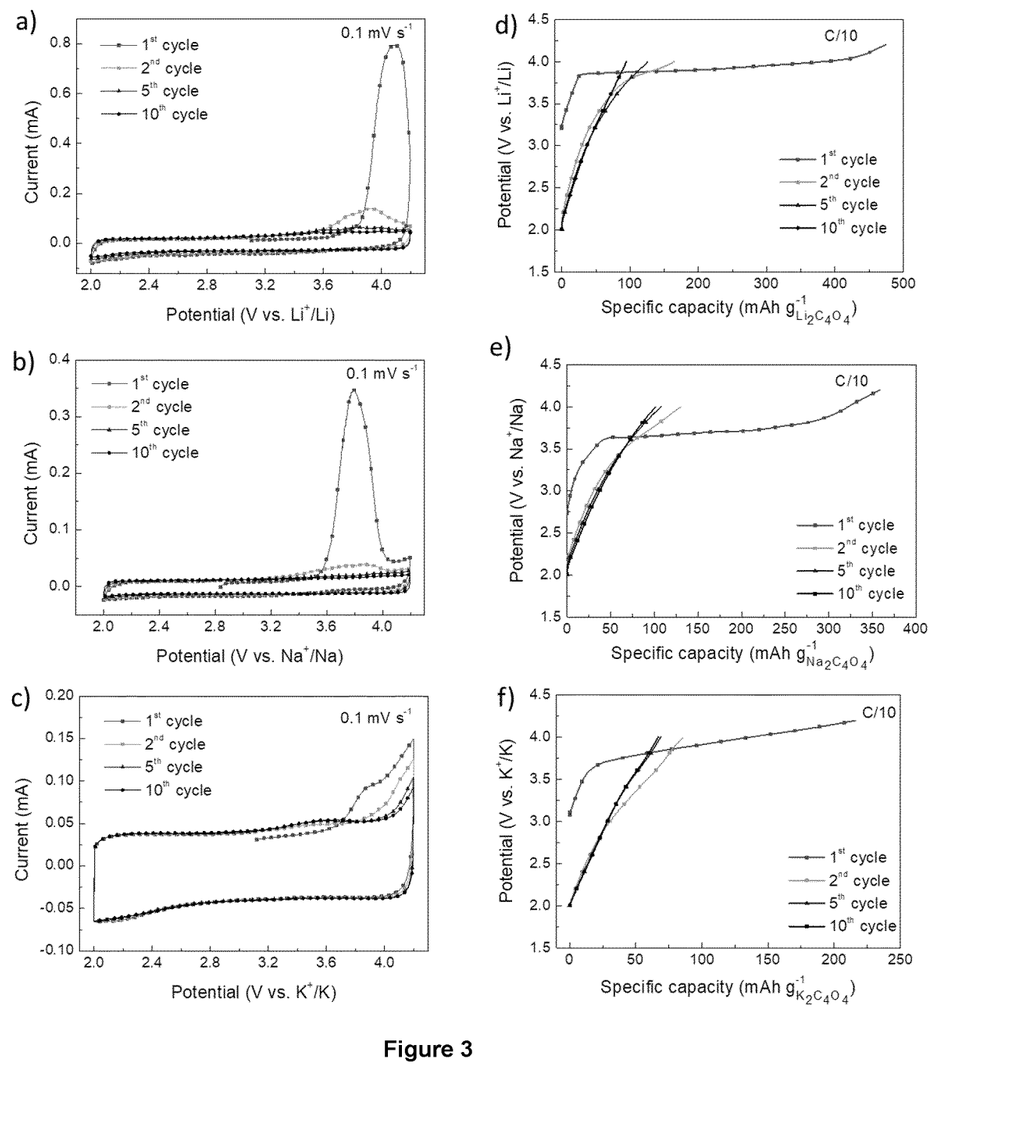
FIG. 3 shows $1^{st}$, $5^{th}$ and $10^{th}$ CV and charge/discharge cycles for $Li_2C_4O_4$, $Na_2C_4O_4$ and $K_2C_4O_4$ mixed with activated carbon in a 40:50 ratio with 5:5 for C65 conducting carbon and PVDF binder, as described in examples 3-5. After the first cycle, the remaining capacity is only owing to the AC contribution.

FIG. 3 shows the different sacrificial salt combined with AC for the development of the positive electrode, hereafter named as "AC+salt". FIG. 3a shows $Li_2C_4O_4$ mixed with AC, conducting carbon (C65) and binder (PVDF) in weight ratio of 40 wt %, 50 wt %, 5 wt % and 5 wt % respectively. CVs show voltammograms recorded at 0.1 mV s$^{-1}$ between 2—4.2 V vs. Li+/Li. The upper potential was limited owing to the instability of the electrolyte beyond that potential. In the first anodic sweep, a broad peak between 3.8 V and 4.2 V vs. Li+/Li describes the irreversible oxidation reaction of the salt. In the following cycle less intense peak appears owing to the salt remaining in the electrode. By the 10$^{th}$ cycle only the typical rectangular voltammogram of ACs is visible, confirming the total decomposition of the AC+salt while the contribution of the AC remains unvaried. GA charge/discharge was also followed. FIG. 3d shows the first charge step of the composite at C/10 (being C the theoretical specific capacity of $Li_2C_4O_4$), showing an irreversible specific capacity of 480 mAh g$^{-1}$ respect the mass of the salt. This higher capacity than the theoretical one of the salt is ascribed to the contribution of the AC. Additionally, the rate capability of the new positive electrode was followed between 2-4 V vs. Li+/Li and compared with a reference AC (without sacrificial salt, $AC_{reference}$) in order to see the possible impact of the residual products in the electrochemical performance.

Figure 4:
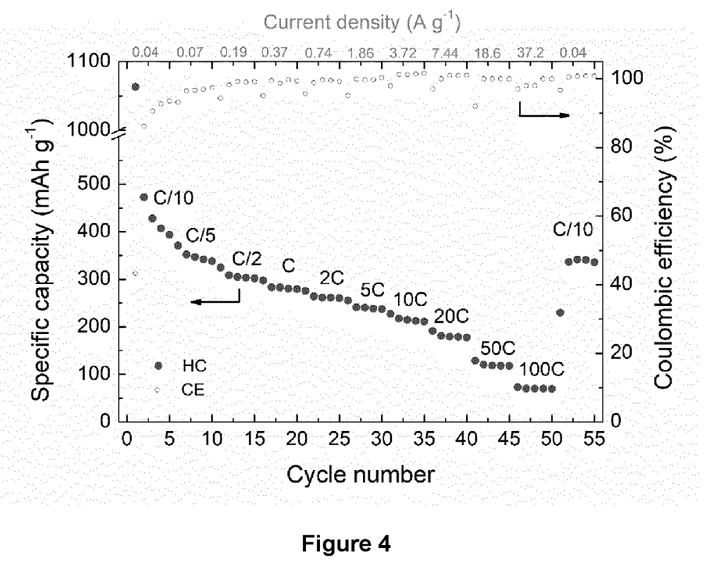
FIG. 4 shows rate capability test together with the coulombic efficiency for an olive pit derived hard carbon vs. $Li/Li^+$, as described in example 3.

FIG. 4 shows rate capability test performed to the hard carbon material to be used on the assembly of the LIC. GA charge/discharge measurement at different C-rates is shown where C corresponds to the theoretical capacity of $LiC_6$ being 372 mAh g$^{-1}$. In the first charge step at C/10, the HC delivers 1063 mAh g-1 from which 461 mAh g-1 are reversible, showing a CE of 43.4%. The high irreversible capacity observed for the HC is ascribed to its lower particle size and disordered nature that increases the electrode area. After 5 cycles capacity stabilizes in 394 mAh g$^{-1}$. Subsequent charge/discharges between at 2C rate delivers 260 mAh g$^{-1}$ for the HC and maintains an excellent specific capacity value at high power demanding rates, i.e. 215 mAh g$^{-1}$ at 100, 120 mAh g$^{-1}$ at 50C and 70 mAh g$^{-1}$ at 100C.

Figure 5:
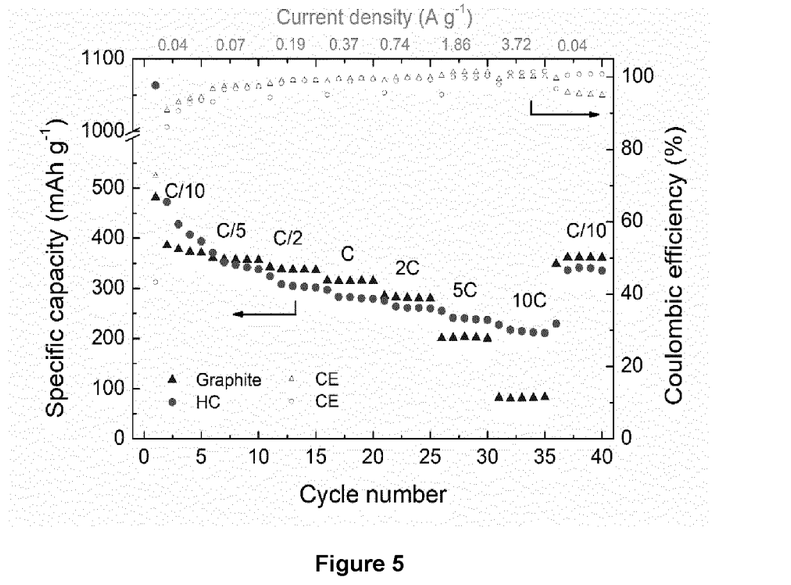
FIG. 5 shows rate capability test together with the coulombic efficiency an olive pit derived hard carbon compared to commercially available graphite vs. $Li/Li^+$, as described in example 3.

FIG. 5 shows rate capability test performed to the hard carbon material to be used on the assembly of the LIC compared to a similar graphite electrode. While rate capability is very similar up to 2C charge discharge rate, at 5C differences start to arise while at 100 it is already obvious that the HC outperform its graphite counterpart by at least a factor of 2.5 while this difference increases while the applied C rate increases. Thus, the convenience of using HC over graphite for powerful LICs is demonstrated. On the other hand the first CE for the HC is 42% while for the graphite is 72%.

Figure 6:
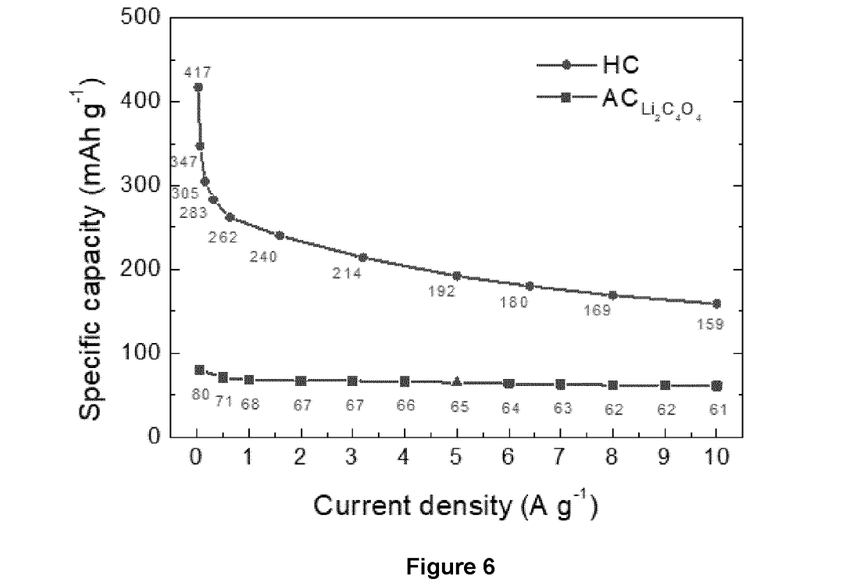
FIG. 6 shows capacity comparison for an olive pit derived hard carbon and activated carbon mixed with lithium squarate in order to select the best mass balance possible, as described in example 3.

In order to obtain the maximum capacity output of the electrodes and being able to successfully overcome the first lithiation step, the active mass of the positive and negative electrodes needs to be balanced, as the charge stored in both electrodes must be equal (m+C+ΔV+=m−C−ΔV−). In FIG. 6, specific capacities of both electrodes are compared at different current densities. Accordingly, a 1:1 (HC:AC+salt) mass ratio was selected for the development of the LICs.

Figure 7:
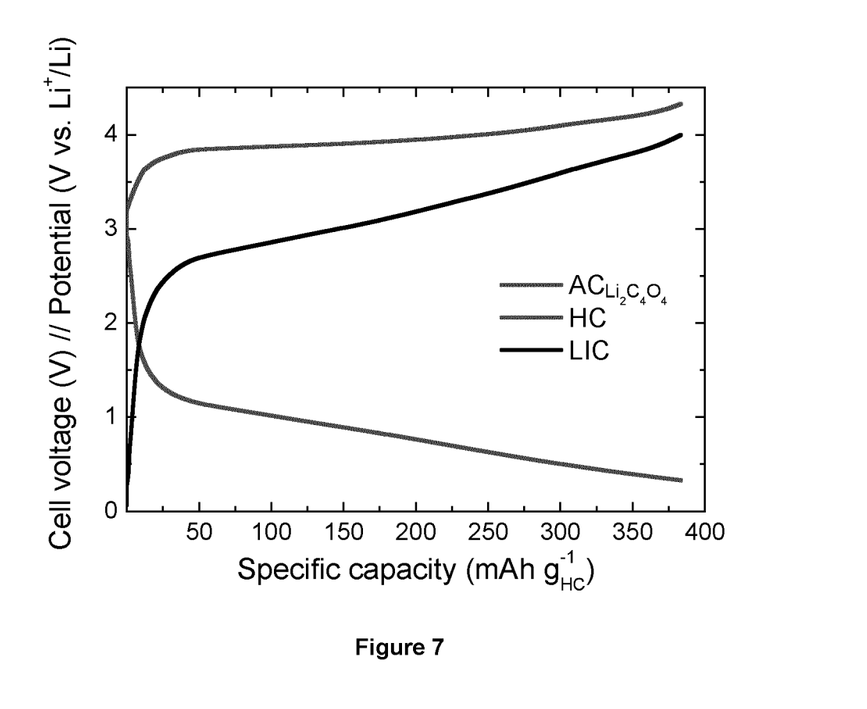
FIG. 7 shows first charge for a LIC carried out at C/10 together with the potential swing of the HC and AC+ salt, as described in example 3. LIC was assembled using a 1 to 1 mass balance and charge was carried out at C/10.
Figure 8:
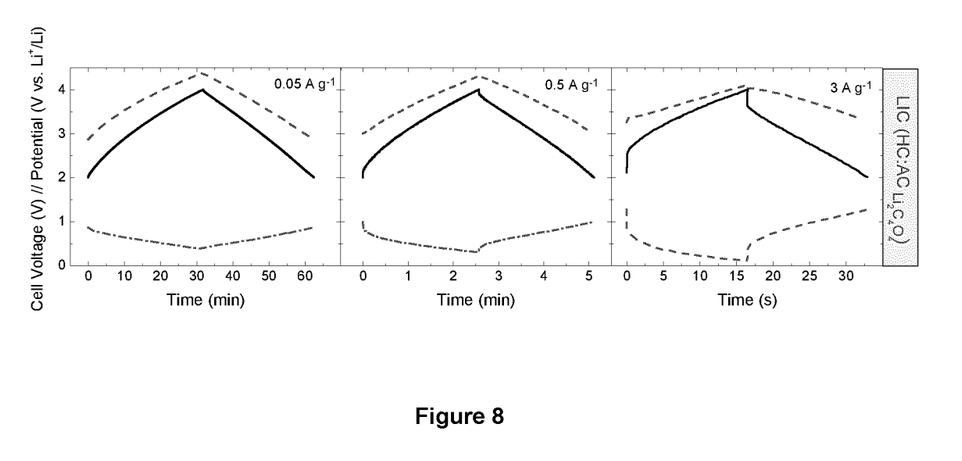
FIG. 8 shows voltage profiles for a LIC operated between 2-4 V at different applied currents accounting for different discharge times ranging from several minutes to few seconds, as described in example 3. Potential swing for HC and AC+ salt is also shown.

FIG. 7 shows the first galvanostatic lithiation of HC-based LICs. First, LIC (HC:AC+salt) was charged at C/10 respect the mass of HC up to a fixed 4.2 V voltage at C/10 respect the mass of the HC. At the same time Li$^+$ was extracted from the positive electrode and inserted into the microstructure of the HC allowing to reach 330 mV vs. Li$^+$/Li. Posterior cycling and system as well as electrode performance is evaluated in FIG. 8, where the different charge/discharge profiles of the ACs (dash red line), the HC (dash-dot green line) and the full LICs (straight black line) at different current densities, going from discharge times affordable by batteries (30 min) to discharge times restricted to EDLCs (15 s) are shown. At low current densities, within a discharge time of ~30 min, the AC shows a symmetric shape indicative of its capacitive storage mechanisms. The AC swings from 2 swings from 2.8 to 4.3 V vs. Li+/Li, while the HC swings from 860 to 380 mV vs. Li+/Li showing a sloppy profile. Further increase in the applied current density to 0.5 A g$^{-1}$, within a discharge time of ~2.5 min, both systems maintain similar behavior, however, the potential window of the negative electrode is slightly widened. Nevertheless the HC still performs at a safe potential, far from plating potentials. Increasing the applied current density and going toward discharge times which are normally limited for EDLCs, the HC displays an outstanding behavior within a discharge time of only 15 s.

Figure 9:
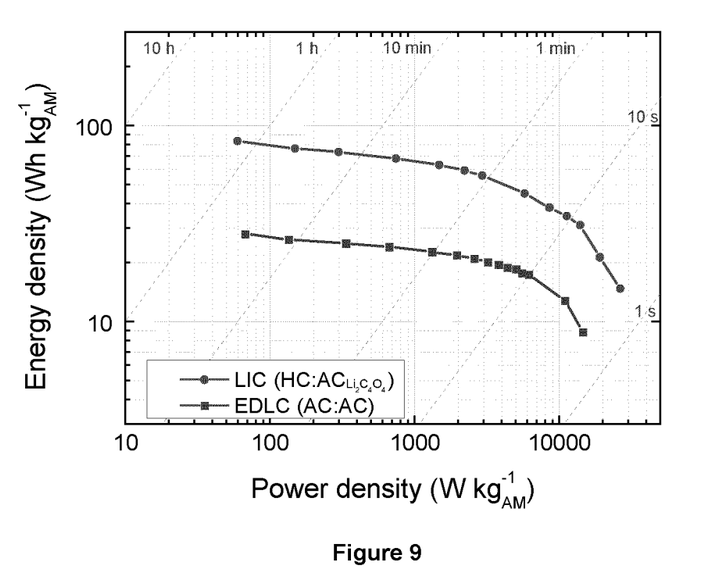
FIG. 9 shows Ragone Plot comparing a herein reported LIC with an EDLC based on symmetric olive pit derived ACs for comparison, as described in example 3.

Energy and power density values are referred to the sum of the active mass (AM) of both electrodes (mg of HC and mg of AC) and are reported in the Ragone plot of FIG. 9. High energy density values are achieved at different power densities for both devices. Nonetheless, the ultrafast respond that the HC-based LIC achieves, overcomes the energy feature of graphite-based LIC in view of high power applications. Compared to a conventional EDLC based on symmetric olive pit derived ACs, 2 to 3 fold increase is observed in energy density along the different power density requirements Example 4—Sodium ion Capacitor The method for negative electrode presodiation was studied in a sodium ion capacitor that contains a negative electrode based on hard carbon and a positive electrode based on activated carbon and $Na_2C_4O_4$ separated with fiber glass immersed in 1M $NaFP_6$ EC:PC, build in an airtight Swagelok cell. FIG. 1b depicts XRD patterns of the sodium sacrificial salt synthetized (experimental, up) and registered in the inorganic crystal structure database (ICDS, down).

As previously noted, FIG. 2 depicts the electrochemical performance of the synthesized salts in a half cell configuration in order to determine the decomposition potential and the experimental capacity. FIG. 2b shows the case for the sodium squarate in 1M $NaPF_6$ EC:PC. The first cycle shows a broad peak between 3.5-4.15 V vs. $Na^+/Na$ in which the decomposition of $Na_2C_4O_4$ occurs. The second cycle shows a broad but much less intense peak ascribed to the salt remaining in the electrode after the first cycle. Even so, the absence of peaks in the following cycles shows that all the salt has been irreversibly decomposed. FIG. 2e shows the GA charge/discharge measurement carried out within the 2-4.2 V vs. $Na^+/Na$ potential window. The first charge at C/10 up to 4.2 V (being C the theoretical capacity of $Na_2C_4O_4$ corresponding to 339.268 mAh $g^{-1}$ shows a sloppy profile between 3.7-4.2 V vs. Na+/Na from which an irreversible specific capacity of 275 mAh $g^{-1}$ is obtained. In the next cycles the capacity is almost null, corresponding to super C65.

FIG. 3b shows $Na_2C_4O_4$ mixed with AC, conducting carbon (C65) and binder (PVDF) in weight ratio of 40 wt %, 50 wt %, 5 wt % and 5 wt % respectively. CVs show voltammograms recorded at 0.1 mV $s^{-1}$ between 2-4.2 V vs. Li+/Li. The upper potential was limited owing to the instability of the electrolyte beyond that potential. In the first anodic sweep, a broad peak between 3.6 V and 4 V vs. Li+/Li describes the irreversible oxidation reaction of the salt. In the following cycle less intense peak appears owing to the salt remaining in the electrode. By the $10^{th}$ cycle only the typical rectangular voltammogram of ACs is visible, confirming the total decomposition of the AC+salt while the contribution of the AC remains unvaried. GA charge/discharge was also followed. FIG. 3e shows the first charge step of the composite at C/10 (being C the theoretical specific capacity of $Na_2C_4O_4$), showing an irreversible specific capacity of 350 mAh $g^{-1}$ respect the mass of the salt. This higher capacity than observed for the one measured for the reference salt is ascribed to the contribution of the AC.

Figure 10:
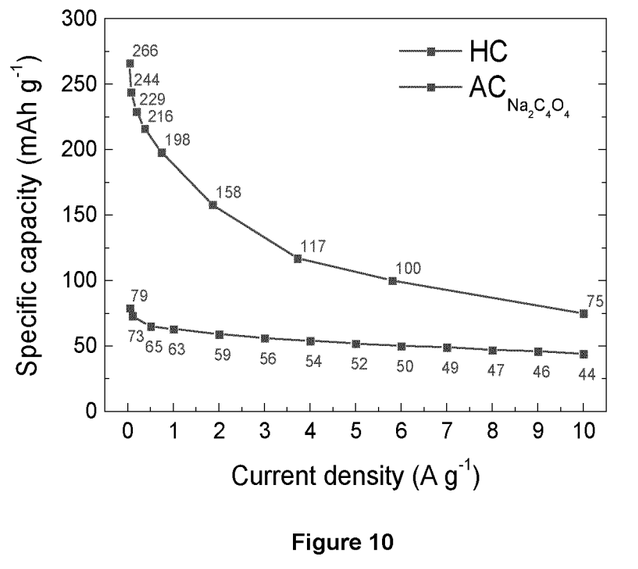
FIG. 10 shows capacity comparison for an olive pit derived hard carbon and activated carbon mixed with sodium squarate in order to select the best mass balance possible, as described in example 4.

In order to obtain the maximum capacity output of the electrodes and being able to successfully overcome the first sodiation step, the active mass of the positive and negative electrodes needs to be balanced, as the charge stored in both electrodes must be equal ($m_+C_+\Delta V_+=m_-C_-\Delta V_{31}$). In FIG. 10 the rate capability of the HC and the AC+$Na_2C_4O_4$ composite are summarized in order to set the correct mass ratio of the device. In this case, owing to the sloppy capacity values of the HC along the different current densities, in order to avoid further sodium plating at high current densities a 1:1 mass ratio was selected.

Figure 11:
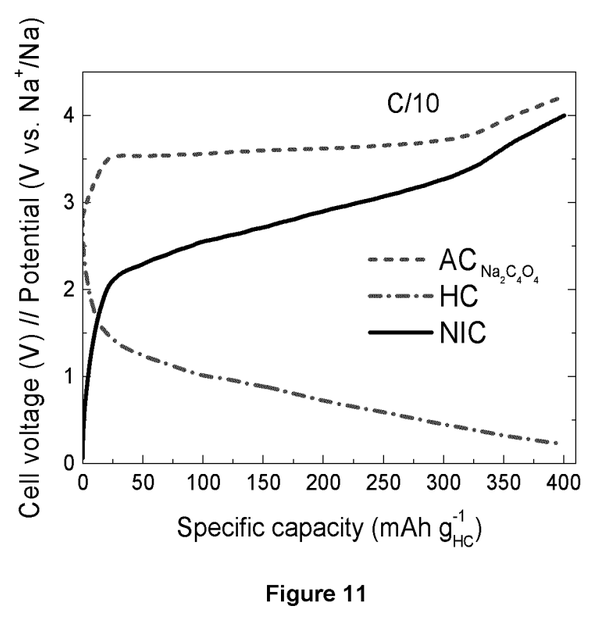
FIG. 11 shows the first charge for a NIC carried out at C/10 together with the potential swing of the HC and AC+ salt, as described in example 4.

FIG. 11 shows the first charge step up to a fixed 4.2 V at C/10 respect the mass of the HC. In this step, while the overall device is charged, the sodium-based sacrificial salt of the positive electrode is oxidized in the potential of 3.5-4 V vs. $Na^+/Na$, while the extracted $Na^+$ is inserted into the microstructure of the HC and a cut-off potential of 180 mV is achieved.

Figure 12:
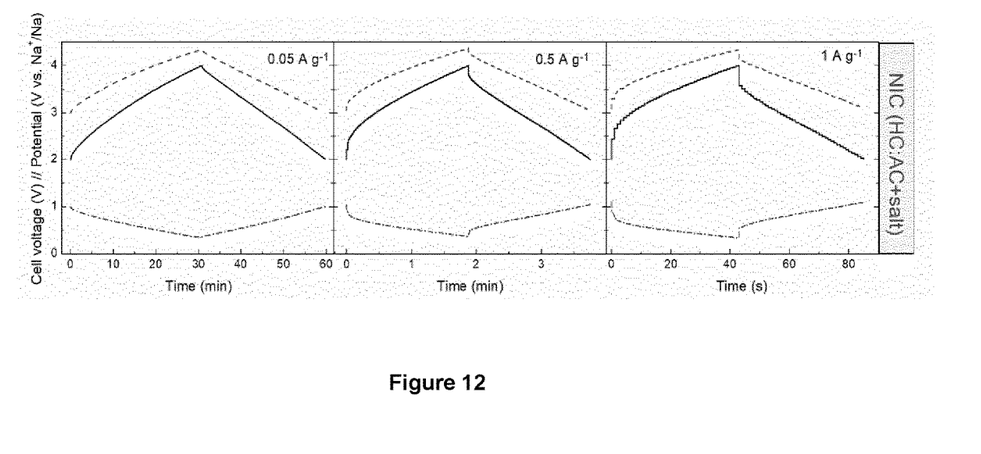
FIG. 12 shows voltage profiles for a NIC operated between 2-4 V at different applied currents accounting for different discharge times ranging from several minutes to few seconds, as described in example 4. Potential swing for HC and AC+ salt is also shown.
Figure 13:
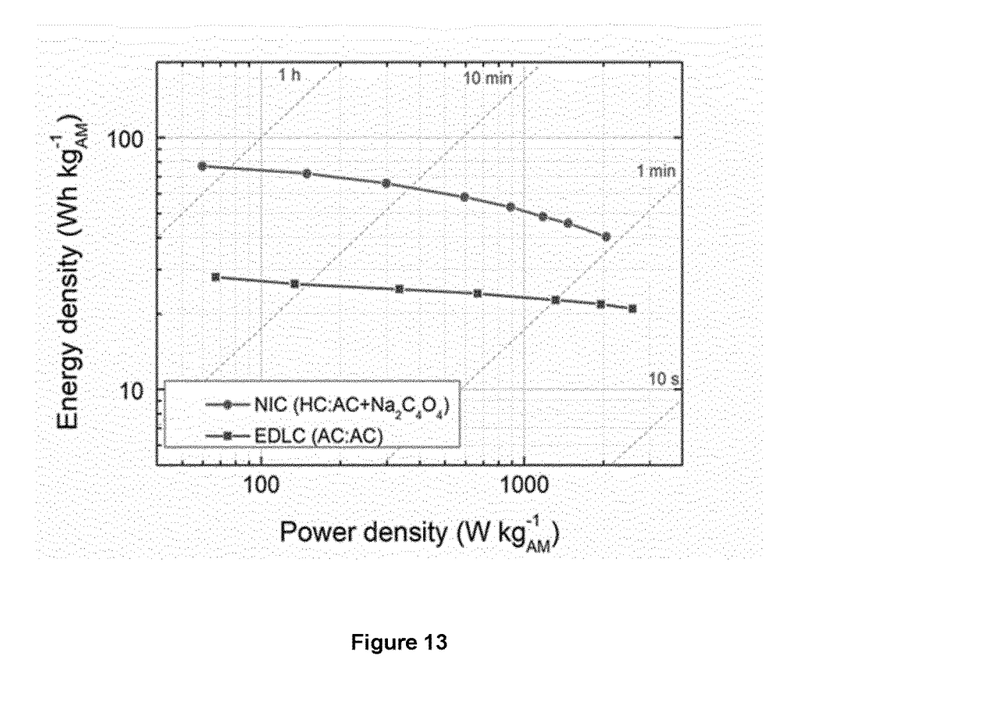
FIG. 13 shows a Ragone Plot comparing a herein reported NIC with an EDLC based on symmetric olive pit derived ACs for comparison purposes, as described in example 4.

After the pre-sodiation step was completed, GA charge/discharge measurement was followed for the NIC in the cell voltage of 2-4 V at different current densities. FIG. 12 shows the different charge/discharge profiles of the ACs (dash red line), the HC (dash-dot green line) and the full NICs (straight black line) at different current densities. In all of them, the AC potential window swings from 3 to 4 V vs. Na+/Na, while the HC potential window swings from 1 V to about 300 mV vs. Na+/Na, avoiding any sodium plating into the surface of the negative electrode. Energy and power density values—referred to the sum of the active mass (AM) of both electrodes (mg HC and mg of AC) of the pre-sodiated NIC are reported in the Ragone plot in FIG. 13. At low power density, within a discharge time of ~30 min, the developed pre-sodiated NIC can deliver as much as energy density as its LIC counterpart being this about 72 Wh $kg-1_{AM}$. While, increasing the applied current density and going to discharge times of ~10 min, still the energy density is maintained in 58 Wh $kg-1_{AM}$. Nevertheless, owing to the hindered diffusion of Na+ at high rates, the NIC delivers lower specific energy values than the developed LIC. However, it still is able to provide higher energy density values than its EDLC counterpart up to the power density of 2000 Wh $kg-1_{AM}$-within a discharge time of ~1 min-without any sodium plating.

Example 5—Potassium ion Capacitor

FIG. 1c depicts XRD pattern of the potassium sacrificial salt.

As previously noted, FIG. 2 depicts the electrochemical performance of the synthesized salts in a half cell configuration in order to determine the decomposition potential and the experimental capacity. FIG. 2c shows the case for the potassium squarates in 1M $KPF_6$ EC:DMC. The first cycle shows a broad peak between 3.5-4.5 V vs. $K^-VK$ in which the decomposition of $K_2O_4O_4$ occurs. Further increase on the current is ascribed to the electrolyte decomposition. In the subsequent cycles, the peak between 3.5-4.5 V disappears but peaks above 4.5 V confirms electrolyte decomposition. FIG. 2f shows the GA charge/discharge measurement carried out within the 2-4.5 V vs. $K^+/K$ potential window. The first charge at C/10 up to 4.5 V (being C the theoretical capacity of $K_2C_4O_4$ corresponding to 282 mAh $g^{-1}$ shows a sloppy profile between 3.6-4.5 V vs. $K^+/K$ from which an irreversible specific capacity of 225 mAh $g^{-1}$ is obtained. In the next cycles the capacity is almost null, corresponding only to super C65.

FIG. 3c shows $K_2C_4O_4$ mixed with AC, conducting carbon (C65) and binder (PVDF) in weight ratio of 40 wt %, 50 wt %, 5 wt % and 5 wt % respectively. CVs show voltammograms recorded at 0.1 mV s$^{-1}$ between 2-4.2 V vs. Li+/Li. The upper potential was limited owing to the instability of the electrolyte beyond that potential. In the first anodic sweep, a broad peak between 3.6 V and 4.2 V vs. Li$^+$/Li describes the irreversible oxidation reaction of the salt. In the following cycle less intense peak appears owing to the salt remaining in the electrode. By the 10$^{th}$ cycle only the typical rectangular voltammogram of ACs is visible, confirming the total decomposition of the AC+salt while the contribution of the AC remains unvaried. GA charge/discharge was also followed. FIG. 3f shows the first charge step of the composite at C/10 (being C the theoretical specific capacity of $K_2C_4O_4$), showing an irreversible specific capacity of 250 mAh g$^{-1}$ respect the mass of the salt. This higher capacity than observed for the one measured for the reference salt is ascribed to the contribution of the AC.

Figure 14:
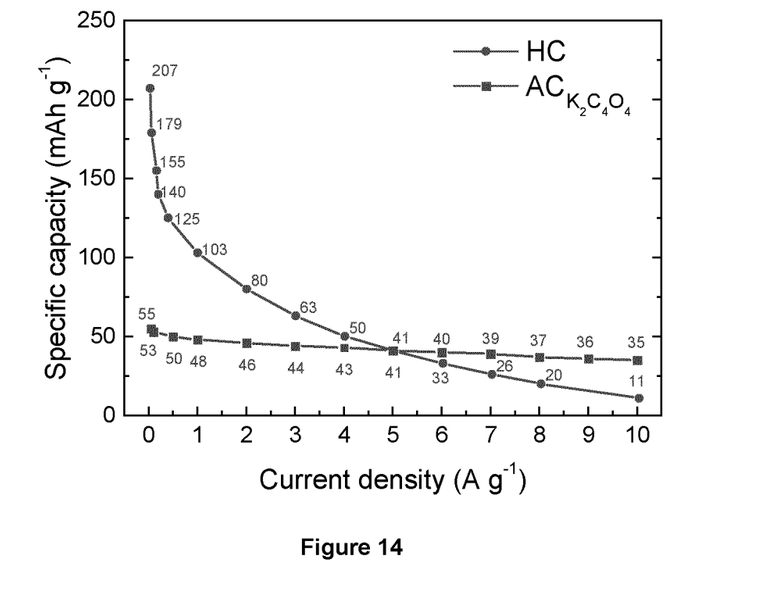
FIG. 14 shows capacity comparison for an olive pit derived hard carbon and activated carbon mixed with potassium squarate in order to select the best mass balance possible, as described in example 5.

In order to obtain the maximum capacity output of the electrodes and being able to successfully overcome the first prepotassiation step, the active mass of the positive and negative electrodes needs to be balanced, as the charge stored in both electrodes must be equal ($m_+C_+\Delta V_+=m_-C_-\Delta V_-$). In FIG. 14 the rate capability of the HC and the AC+$K_2C_4O_4$ composite are summarized in order to set the correct mass ratio of the device. In this case, owing to the sloppy capacity values of the HC along the different current densities, in order to avoid further potassium plating at high current densities a 1:1 mass ratio was selected.

Figure 15:
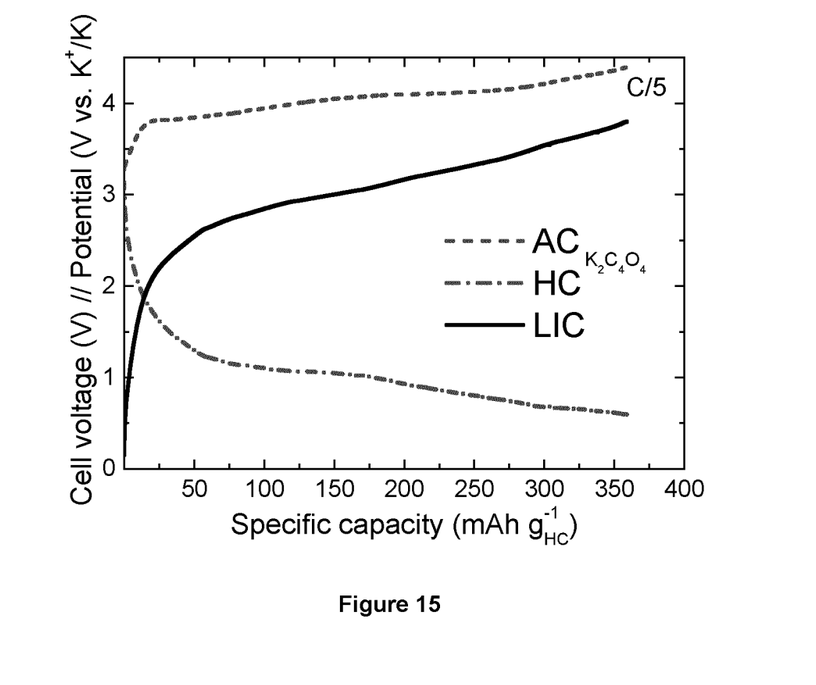
FIG. 15 shows the first charge for a KIC carried out at C/10 together with the potential swing of the HC and AC+ salt, as described in example 5.

FIG. 15 shows the first charge step up to a fixed 4.2 V at C/10 respect the mass of the HC. In this step, while the overall device is charged, the potassium-based sacrificial salt of the positive electrode is oxidized in the potential of 3.5-4.2 V vs. K$^+$/K, while the extracted K$^+$ is inserted into the microstructure of the HC and a cut-off potential of 600 mV is achieved.

The invention claimed is:

1. A metal ion capacitor comprising:
a negative electrode which comprises a hard carbon,
a positive electrode which comprises an activated carbon and a sacrificial salt mixed with a conducting carbon to obtain a carbon coating on the salt, and
a separator positioned between the two electrodes, wherein the sacrificial salt is selected from the group consisting of squarate, oxalate, ketomalonate, di-ketosuccinate and a combination thereof.

2. The metal ion capacitor according to claim 1, wherein the metal ion capacitor is an alkali metal ion capacitor.

3. The metal ion capacitor according to claim 1, wherein the metal ion capacitor is a lithium, sodium or potassium ion capacitor.

4. The metal ion capacitor according to claim 1, wherein the hard carbon of the negative electrode has an average particle size in the range from about 0.1 to about 5 microns.

5. The metal ion capacitor according to claim 1, wherein the sacrificial salt is selected from the group consisting of squarate, and ketomalonate or a combination thereof.

6. The metal ion capacitor according to claim 5, wherein the sacrificial salt is an squarate of formula $M_2C_4O_4$ wherein M is selected from Li, Na and K.

7. The metal ion capacitor according to claim 1, wherein the positive electrode comprises about 10 to 60 weight % sacrificial salt.

8. A process for manufacturing the metal ion capacitor according to claim 1, comprising preparing the negative hard carbon electrode and/or the activated carbon of the positive electrode from biomass waste.

9. The process for manufacturing the metal ion capacitor according to claim 8, comprising preparing the negative hard carbon electrode and/or the activated carbon of the positive electrode from olive pit.

10. The process for manufacturing the metal ion capacitor according to claim 8, wherein the metal ion capacitor is an alkali metal ion capacitor.

11. The process for manufacturing the metal ion capacitor according to claim 8, wherein the metal ion capacitor is a lithium, sodium or potassium ion capacitor.

12. The process for manufacturing the metal ion capacitor according to claim 8, wherein the hard carbon of the negative electrode has an average particle size in the range from about 0.1 to about 5 microns.

13. The process for manufacturing the metal ion capacitor according to claim 8, wherein the sacrificial salt is selected from the group consisting of squarate, ketomalonate and a combination thereof.

14. The process for manufacturing the metal ion capacitor according to claim 13, wherein the sacrificial salt is an squarate of formula $M_2C_4O_4$ wherein M is selected from Li, Na and K.

15. The process for manufacturing the metal ion capacitor according to claim 8, wherein the positive electrode comprises about 10 to 60 weight % sacrificial salt.

16. A method of using a sacrificial salt as a source of metal ions for pre-doping a negative electrode of a metal ion capacitor and to compensate for the need of metal ions to form the solid electrolyte interphase (SEI) on the negative electrode comprising combining said sacrificial salt with activated carbon in the positive electrode, wherein said sacrificial salt is selected from the group consisting of squarate, oxalate, ketomalonate, di-ketosuccinate and a combination thereof, mixing said sacrificial salt with a conducting carbon to obtain a carbon coating on the salt, and wherein said negative electrode comprises a hard carbon.

* * * * *